US008534312B2

(12) United States Patent
Burgess et al.

(10) Patent No.: US 8,534,312 B2
(45) Date of Patent: Sep. 17, 2013

(54) GAS CONTROL DEVICE WITH PROTECTIVE COVER

(75) Inventors: Richard Burgess, Houston, TX (US); Ralph A. Diaz, Cypress, TX (US)

(73) Assignee: Air Liquide Healthcare America Corporation, Houston, TX (US)

( * ) Notice: Subject to any disclaimer, the term of this patent is extended or adjusted under 35 U.S.C. 154(b) by 1199 days.

(21) Appl. No.: 12/260,532

(22) Filed: Oct. 29, 2008

(65) Prior Publication Data

US 2009/0050218 A1 Feb. 26, 2009

Related U.S. Application Data

(63) Continuation of application No. 11/758,541, filed on Jun. 5, 2007, now abandoned.

(51) Int. Cl.
*F16K 27/08* (2006.01)

(52) U.S. Cl.
USPC .......................................... 137/382; 137/377

(58) Field of Classification Search
USPC .................................................. 137/377, 544
See application file for complete search history.

(56) References Cited

U.S. PATENT DOCUMENTS

| | | | | |
|---|---|---|---|---|
| 2,803,138 | A * | 8/1957 | Strobl | 73/431 |
| 3,788,511 | A | 1/1974 | Marsh | |
| 4,062,356 | A | 12/1977 | Merrifield | |
| 4,678,003 | A * | 7/1987 | Griffin | 137/382 |
| 5,058,758 | A * | 10/1991 | Suddeth | 220/724 |
| 5,253,760 | A | 10/1993 | Miller | |
| 5,505,226 | A * | 4/1996 | Breth | 137/377 |
| 5,516,424 | A * | 5/1996 | Strohschein | 210/232 |
| 5,975,121 | A * | 11/1999 | Arzenton et al. | 137/377 |
| 6,595,230 | B2 | 7/2003 | Raboin | |
| 6,886,587 | B2 * | 5/2005 | Fancher | 137/382 |
| 6,941,964 | B1 * | 9/2005 | Hess et al. | 137/1 |
| 7,237,570 | B2 * | 7/2007 | Gamard et al. | 137/613 |
| 7,703,821 | B2 * | 4/2010 | Swain | 294/27.1 |
| 8,162,587 | B2 * | 4/2012 | Hagstrom et al. | 414/810 |

(Continued)

FOREIGN PATENT DOCUMENTS

| | | |
|---|---|---|
| CH | 432249 | 3/1967 |
| EP | 0903162 | 3/1999 |

(Continued)

OTHER PUBLICATIONS

PCT Search Report and Written Opinion for PCT/IB2008/052222.

*Primary Examiner* — Eric Keasel
*Assistant Examiner* — Matthew W Jellett
(74) *Attorney, Agent, or Firm* — Christopher J. Cronin; Allen E. White

(57) ABSTRACT

A method and apparatus for providing a gas to or from a pressurized cylinder is described. The apparatus includes a gas delivery device housing that houses and protects a gas control device configured to deliver gas to a user or device, and may also be adapted to provide gas to the pressurized cylinder in a refilling process. The housing includes a surface free from unnecessary depressions and/or protrusions to facilitate cleanability and enhance safety during use. Adjustment indicators and status indication elements disposed in or on portions of the housing are configured to enhance readability and recognition, which facilitates safe and efficient operation of the device. Adjustable elements to control a flow metric from the gas control device are adapted to facilitate adjustment by a user with a large hand and/or a user suffering from some diminished physical capability.

11 Claims, 6 Drawing Sheets

(56) References Cited

U.S. PATENT DOCUMENTS

| | | | | |
|---|---|---|---|---|
| 2004/0020793 | A1 | 2/2004 | Peterolff et al. | |
| 2006/0065672 | A1 | 3/2006 | Lecourt et al. | |
| 2008/0110925 | A1 * | 5/2008 | Hagstrom et al. | 222/3 |

FOREIGN PATENT DOCUMENTS

| | | |
|---|---|---|
| JP | 07269790 | 10/1995 |
| WO | 0159358 | 8/2001 |
| WO | 2007048953 | 5/2007 |

* cited by examiner

GAS CONTROL DEVICE WITH PROTECTIVE COVER

BACKGROUND

The invention relates to a gas delivery device for coupling to a pressurized gas source or pressure vessel, such as a pressurized cylinder used for storage and transportation of medical and industrial gases.

Generally, high-purity gases are used in many industries, such as manufacturing, in electronic applications, and in the medical field. These gases are typically provided to users in pressurized cylinders that may be configured to be highly transportable for use in laboratories, workshops, medical settings, and remote locations by scientists, medical personnel, medical patients, among others.

Generally, in the medical field, medical gas therapy includes providing high-purity gases to individuals or patients before, during, or after a medical procedure, in response to some sickness or malady, or to individuals who are otherwise in need of supplemental gases. Examples of high-purity gases used in the medical field include oxygen ($O_2$), nitrogen ($N_2$), nitrous oxide ($NO_2$), a nitrous oxide/oxygen mixture, among others. These gases are generally provided in high pressure aluminum and steel cylinders at pressures that range from 500-2200 psi. The pressurized cylinders may be of a size that facilitates transportability of the cylinder to enable easy transportation of the gas by users. The small size of the pressurized cylinders also enables use of the gas by individuals at work, in the home, and in recreational pursuits.

Gas control devices, such as pressure regulators, gas flow controllers, flowmeters, valve integrated pressure regulators (VIPR's), and other integrated regulator/fill/delivery devices, are typically coupled to the pressurized cylinders to facilitate delivery, filling, and general valving of the gas contained therein. The gas control device may be integral to the pressurized cylinder or may be removably coupled to the cylinder to facilitate use of the device on more than one cylinder. The gas control device and the pressurized cylinder may be generally referred to as a portable medical gas delivery system that is used by persons needing supplemental gas and/or persons in the medical field. These portable medical gas delivery systems may be further coupled to a cart or dolly having wheels or casters to enhance transportability.

As the portable medical gas delivery systems are highly transportable, the systems are often subject to tip-over events and the gas control device coupled thereto is subject to impacts with solid objects during use, handling, transportation, and storage. These impact events may damage the gas control device. To protect the portable medical gas delivery system from potential damage, shrouds or protective covers disposed on or around the system and/or the gas control device have been developed.

Conventional gas control or gas delivery devices coupled to the pressurized cylinders are generally scaled similarly to the cylinder and are typically small to minimize weight and facilitate transportability. For example, the pressurized cylinders generally include a height and a diameter, and the gas control device and/or the protective cover includes an outer dimension, which may include a perimeter or outer diameter that substantially matches the diameter of the pressurized cylinder. This scaling of the gas delivery device and/or protective cover lends an aesthetic aspect to the portable gas delivery system, and may also minimize weight and bulk of the system, which facilitates greater transportability.

Portable gas delivery systems are generally configured to allow a user to adjust various parameters of the gas control device to facilitate filling and/or delivery of the gas to or from the pressurized cylinder. Examples include adjustments to flow rate, velocity, volumetric adjustments, among others, either to or from the pressurized cylinder. Generally, conventional gas control or delivery devices include a coupling portion adapted to couple to the pressurized cylinder, and include at least one output valve configured to control flow rate of outgoing gas to a user. The output valve typically includes a dial or handwheel that may be accessed by a user to adjust the flow rate.

In one example of a conventional gas delivery device and protective cover, the handwheel to control flow rate is coupled to an upper or outer surface of the gas control device, and the handwheel typically includes characters or values indicative of a flow parameter. As this handwheel is configured to easily move in response to a desired adjustment, the handwheel is generally protected or shielded by a handle or other protective member to prevent accidental movement of the handwheel. While conventional handles or protective members may prevent undesired movement of the handwheel, access to the handwheel by the user and/or recognition of numbers or characters indicative of the flow parameter value may be limited. For example, the handle or protective member may partially cover or otherwise obstruct a view of the flow value characters. This limited view may result in an improper adjustment by a user, which may cause injury to the user. In an emergency procedure or other process where personnel are engaged to perform a double-check of flow values, the limited view of flow value characters may prevent the personnel from performing their task from a stationary position and may be required to move to a position nearer the handwheel in order to view the values. In another example, a user with a large hand or a user experiencing limited movement in the hand and/or arm by the onset of disease or injury may not be able to easily access the handwheel due to the limited area between the protective member or handle and the handwheel, which may prevent the user from performing the desired adjustment.

In addition, conventional protective covers are designed to minimize size and weight with little or no thought to a surface that minimizes pockets, corners, protrusions, concavities, and the like. The surfaces with pockets, corners, protrusions, concavities, and the like may trap debris and/or fluids, such as bodily fluids, that may create a biohazard if not cleaned. For example, outer surfaces with closely spaced elements and/or areas behind or adjacent elements such as the handwheel may trap fluids and debris that are accidentally impinged thereon. In order to sufficiently clean these surfaces, the protective cover and/or the gas control device may need to be disassembled, cleaned, and re-assembled prior to use.

Also, while conventional protective covers may allow access to some adjustment mechanisms of the gas delivery device, the protective covers may not allow sufficient access to a coupling interface of the gas delivery device configured to couple to the pressurized cylinder. As an example, the gas delivery device may be hand-tightened to the pressurized cylinder by relative rotation of one or both of the gas delivery device and the pressurized cylinder, and then a wrench or tool may be used to further tighten the hand-tight connection. Decoupling may operate inversely using the wrench or tool to loosen the gas delivery device from the pressurized cylinder. The conventional protective covers, however, may surround or otherwise limit access to the coupling interface of the gas delivery device and the protective cover may need to be at least partially disassembled to provide access to the coupling interface by the wrench or tool.

What is needed is a gas control device and protective cover that is ergonomically and practically designed in order to reduce difficulties encountered during coupling, adjustment, and/or refilling procedures. In addition, the protective cover should include a design that facilitates cleaning and/or minimization or elimination of areas that may trap fluids or debris.

SUMMARY

Embodiments described herein relate to a method and apparatus for providing a gas to or from a pressurized cylinder. The apparatus includes a housing that houses and protects a gas control device configured to deliver gas to a user or a device, and is configured to provide gas to a cylinder in a refilling process. The housing includes a surface free from unnecessary depressions and/or protrusions to facilitate cleanability and enhance safety during use. Adjustment indicators and status indication elements disposed in or on portions of the housing are configured to enhance readability and recognition, which facilitates safe and efficient operation of the device. Adjustable elements to control a flow metric from the gas control device are adapted to facilitate unobstructed adjustment by a user.

In one embodiment, a portable gas delivery apparatus is described. The apparatus includes a gas control device configured to couple to a compressed gas cylinder and comprising an integrated regulator, a fill valve and a dial for controlling gas flow through the regulator, and a multi-piece body comprising a first portion and a second portion forming substantially symmetrical halves of a housing to accommodate at least a portion of the gas control device, wherein the portions engage one another at an interface to form the housing, the interface being disposed on a longitudinal plane; wherein the first and second portions form a first opening through which the dial is disposed, the dial rotating about a central axis, and a handle sized to accommodate a human hand and disposed on an axis oriented orthogonally to the longitudinal plane and offset from the central axis; wherein the handle is supported from the body by at least one curved extension of the first portion.

In another embodiment, a portable gas delivery apparatus is described. The apparatus includes a gas control device coupled to a compressed gas cylinder, and a body forming a housing about at least a portion of the gas delivery device, the body comprising a first portion and a second portion forming substantially symmetrical halves of the housing, wherein the portions engage one another at an interface to form the housing, the interface being disposed on a longitudinal plane, wherein the first and second portions form a first opening through which a dial is disposed and a second opening through which a pressure gauge is disposed, wherein the dial rotates about a central axis, a handle sized to accommodate a human hand and disposed on an axis oriented orthogonally to the longitudinal plane and offset from the central axis, wherein the handle is supported a distance away from the body by at least two curved extensions of the body, and a recess formed in a lower edge of the first portion and the second portion defining a cutaway portion exposing a wrench landing formed on the gas control device.

In another embodiment, a portable gas delivery apparatus is described. The apparatus includes a gas control device adapted to couple to a compressed gas cylinder, and a two-piece body forming a housing about at least a portion of the gas control device, wherein the gas control device comprises a pressure gauge, a dial, and a gas outlet nipple that extends out of the two-piece body, and the two-piece body comprises a first portion and a second portion forming substantially symmetrical halves of the housing, wherein the portions engage one another at an interface to form the housing, the interface being disposed on a longitudinal plane; wherein the first and second portions form a first opening through which the dial is disposed and a second opening through which the pressure gauge is disposed, wherein the dial rotates about a central axis, wherein the dial includes a plurality of selectable settings capable of being selected by rotating the dial, the selected setting of the plurality of settings being registered with the nipple, a handle sized to accommodate a human hand and disposed on an axis oriented orthogonally to the longitudinal plane and offset from the central axis; wherein the handle is supported from the body by at least two curved extensions of the body, and a recess formed opposite the handle that exposes a wrench landing formed on the gas delivery device.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Embodiments described herein relate to a gas delivery device housing to protect a gas control device disposed therein. The gas control device facilitates delivery of gas to a user or device, and may also be adapted to provide a cylinder filling capability. While the gas delivery device housing and gas control device are exemplarily shown and described for medical gas applications, embodiments described herein may be used in other applications in numerous industries and activities. Examples include laboratories, workshops, dental and veterinary applications, electronic applications, manufacturing facilities, and any other application wherein gases are delivered from a pressurized cylinder to an end use or consumer.

Figure 1:
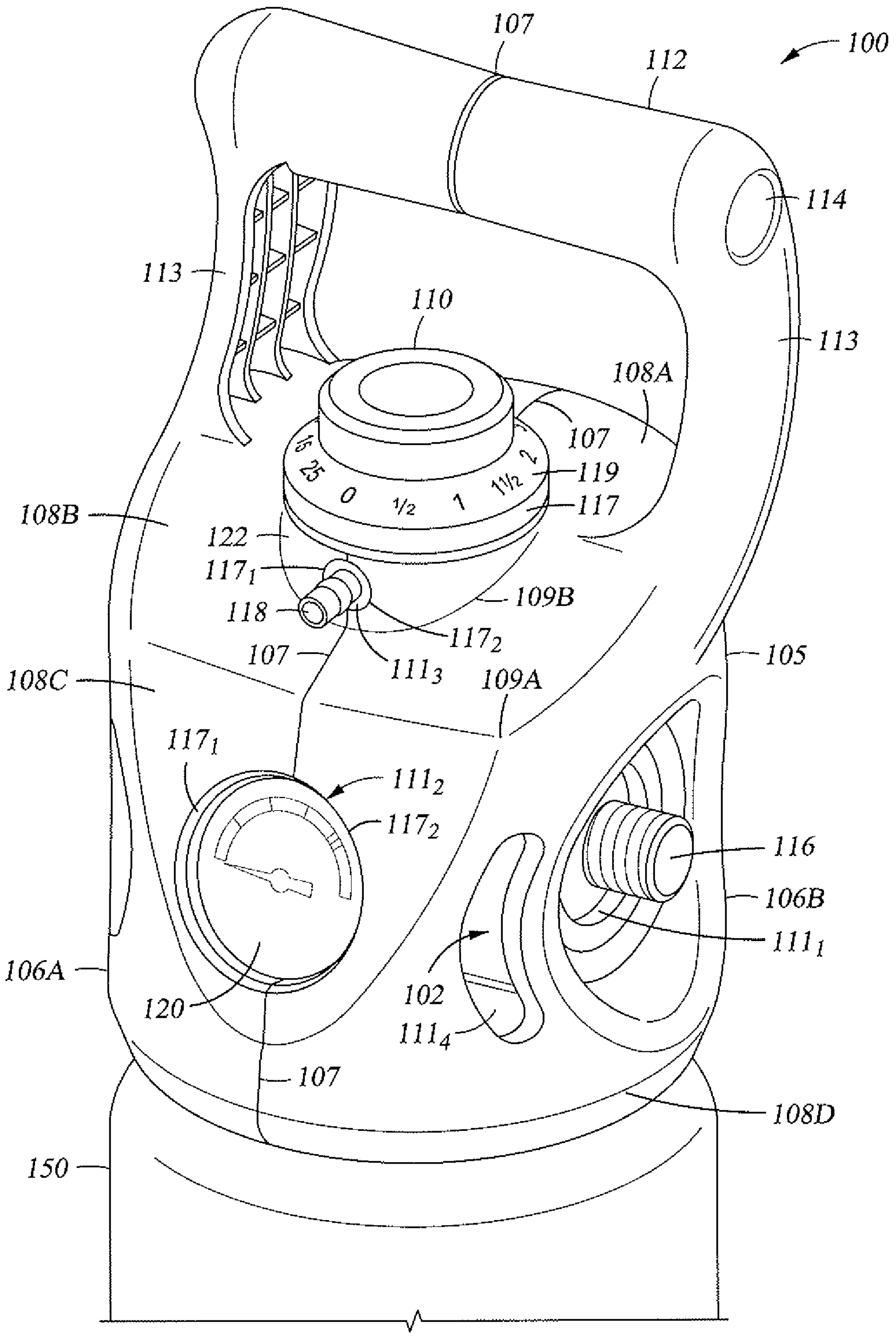
FIG. 1 is an isometric front view of a gas delivery device housing.

FIG. 1 is an isometric front view of a gas delivery device housing 100 configured to couple to and at least partially surround a gas control device 102 is disposed therein. The gas control device 102 may be a pressure regulator, a flow control device, a valve integrated pressure regulator (VIPR) or an integrated regulator and fill valve, and combinations thereof. In one application, the gas delivery device housing 100 is adapted to couple to a pressure vessel or cylinder 150 to provide pressurized gases, such as oxygen ($O_2$), nitrogen ($N_2$), nitrous oxide ($NO_2$), nitrous oxide/oxygen mixtures, among other gases, to the gas control device 102. The body 105 at least partially surrounds the gas control device 102 and functions as a covering or guard to provide protection to the gas control device 102 from impact and other phenomena that may damage the gas control device 102. The body 105 protects the gas control device 102 while also lending an ergonomic and aesthetic aspect to the gas delivery device housing 102. While not shown, it is understood that the gas delivery device housing 100 and the cylinder 150 may be coupled to a cradle or frame to facilitate transportability. The cradle or frame may also comprise a hand-cart or dolly having wheels or casters to facilitate rolling transportation.

The body 105 includes a first section 106A and a second section 106B separated by an interface 107 where the two sections 106A, 106B are coupled or otherwise make contact to form the body 105. The body 105 also includes a handle 112 formed at least partially by an extended portion 113 disposed on each of the first section 106A and second section 106B. The first section 106A and the second section 106B may be removably coupled by a plurality of fasteners (not shown), such as screws, bolts, and the like, disposed in fastening ports 114 (only one is shown in this view) formed in one or both of the first section 106A and the second section 106B.

The body 105 also includes a plurality of openings $\mathbf{111}_N$ formed in or through the first section 106A and second section 106B, wherein N may be any integer. Openings $\mathbf{111}_1$, $\mathbf{111}_2$, $\mathbf{111}_3$ and $\mathbf{111}_4$ are shown in this view and openings $\mathbf{111}_1$, $\mathbf{111}_2$, and $\mathbf{111}_3$ are adapted to receive portions of the gas control device 102 disposed therein. For example, opening $\mathbf{111}_1$ is adapted to receive a connector 116, opening $\mathbf{111}_2$ is adapted to receive a pressure gauge 120, and opening $\mathbf{111}_3$ is adapted to receive a gas barb or nipple 118. Another opening (not shown in this view) is disposed below the handwheel 110 and is configured to receive a portion of the gas control device 102, such as a stem extending from a flow control valve integral to the gas control device 102. One or more of the openings $\mathbf{111}_N$, such as opening $\mathbf{111}_2$ and $\mathbf{111}_3$ may include two portions $\mathbf{117}_1$ and $\mathbf{117}_2$ that are configured a substantial semicircles and form a substantially circular opening when joined at the interface 107. Opening $\mathbf{111}_4$ may be adapted as a lightening hole to minimize the weight of the body 105, and may comprise a curved slot.

The connector 116, nipple 118, and the pressure gauge 120 are parts associated with the gas control device 102 disposed within the body 105 and facilitate filling of a cylinder 150 and/or delivery of gas through the gas delivery device housing 100 from the cylinder 150. The connector 116 may be an ultra high integrity service connector, such as a diameter index safety standard (DISS) connector. The nipple 118 may be an interface for a gas delivery hose, such as a hose barb, and the pressure gauge 120 is a gauge that may be configured to provide a volumetric indication of gas within the cylinder.

In one embodiment, each of the first section 106A and second section 106B are substantially symmetrical halves that at least partially surround or envelope the gas control device 102. The extended portions 113 from each of the first section 106A and second section 106B may include a curve or be formed as an arc segment to provide additional space to access the handwheel 10 disposed between the extended portions 113 and below the handle 112. In this manner, the body 105 provides an aesthetically appealing, ergonomic package to protect the gas control device 102. Additionally, the location or configuration of the handle 112 allows users with larger hands to access to the handwheel 110.

In one embodiment, the handwheel 110 includes a body 117 having multiple settings or increments indicated by values 0, ½, 1, 1½, 2, 3, 4, 6, 8, 10, 15, and 25. Each value may indicate a flow rate in liters per minute (LPM) and are positively set by rotating the handwheel 110 to a desired position. The positive setting at each value is indicated by aligning the desired value with the nipple 118 and the settings are further indicated by a "clicking" sound and/or tactile sensation. The values are large relative to the body 117 and are positioned along an annular portion 119 disposed on the body 117 of the handwheel 110. The annular portion 119 may be angled relative the body 117 to facilitate greater readability and recognition of the values by persons other than the adjustor while also facilitating view of the values from multiple angles. The setting positions and/or the values are registered or aligned with the plane of the nipple 118 to facilitate greater accuracy and determination of the desired flow setting.

The gas control device 102 is capable of no-flow at 0 LPM and is configured for flow rates at ½ LPM to 15 LPM with delivery through the nipple 118. The gas control device 102 is also adapted for a high flow rate at 25 LPM through the nipple 118, which may be used for emergency assisted breathing procedures. A low flow rate, such as 1½ LPM or less, may be provided for specific applications, such as pediatric care, to increase patient safety and efficacy of the gas treatment. Additionally, the connector 116 may be used to provide about a 40 LPM flow rate at about 50 psi directly from the cylinder 150 in situations where a high flow rate is needed. For example, the connector 116 may be used for a temporary ventilator application providing a flow rate of about 40 LPM for about 15 minutes with a full "E" cylinder. Thus, the low flow and extended flow capabilities of the gas control device 102 enable gas delivery to a wide range of patients while also enabling patient transport capabilities for use by emergency medical technicians (EMT's).

The body 105 also includes a face shown as surfaces 108A-108C that is substantially smooth and substantially free from obstructions, protrusions, depressions, pockets and the like that may trap debris or fluids. For example, first surface 108A is substantially planar and meets tapered second surface 108B adjacent the handwheel 110, and tapered second surface 108B slopes downward and transitions into third surface 108C at first radius 109A. A portion of second surface 108B transitions to a collar 122 disposed below handwheel 110 by a second radius 109B. Thus, the face defined at least by surfaces 108A-108C and radius 109A provides an easily cleanable surface that makes the body 105 less likely to retain any fluids impinged thereon. Surface 108D depicts a lower portion or edge of the body 105 as is generally opposite the handle 112 and surface 108A.

The face also enhances cleaning of the body 105 by minimizing obstructions that may hinder cleaning. Other portions of the body 105 and the face may also include transitioning radii into other portions, and end sections that culminate in radii to minimize sharp edges, which prevents or minimizes user injury. For example, an annular radius 445 (shown in FIGS. 4 and 5) may serve to protect users during handling by eliminating any sharp breaks or edges in the body 105, and may additionally serve as a handle to facilitate transportability of the housing 100. Decals (not shown) may be adhered to portions of the face to identify elements of, or indicate directional operation of, the gas control device 102 and/or the gas delivery device housing 100. For example, a decal may be adhered to tapered surface 108B to indicate an "on" and "off" directional movement of the handwheel 110 that is aided by directional arrow decals adjacent the "on" and "off" indicator decals. Any decals that may be adhered to the gas delivery device housing 100 may comprise a fluorescent material to facilitate recognition of the decals in the dark.

Figure 2:
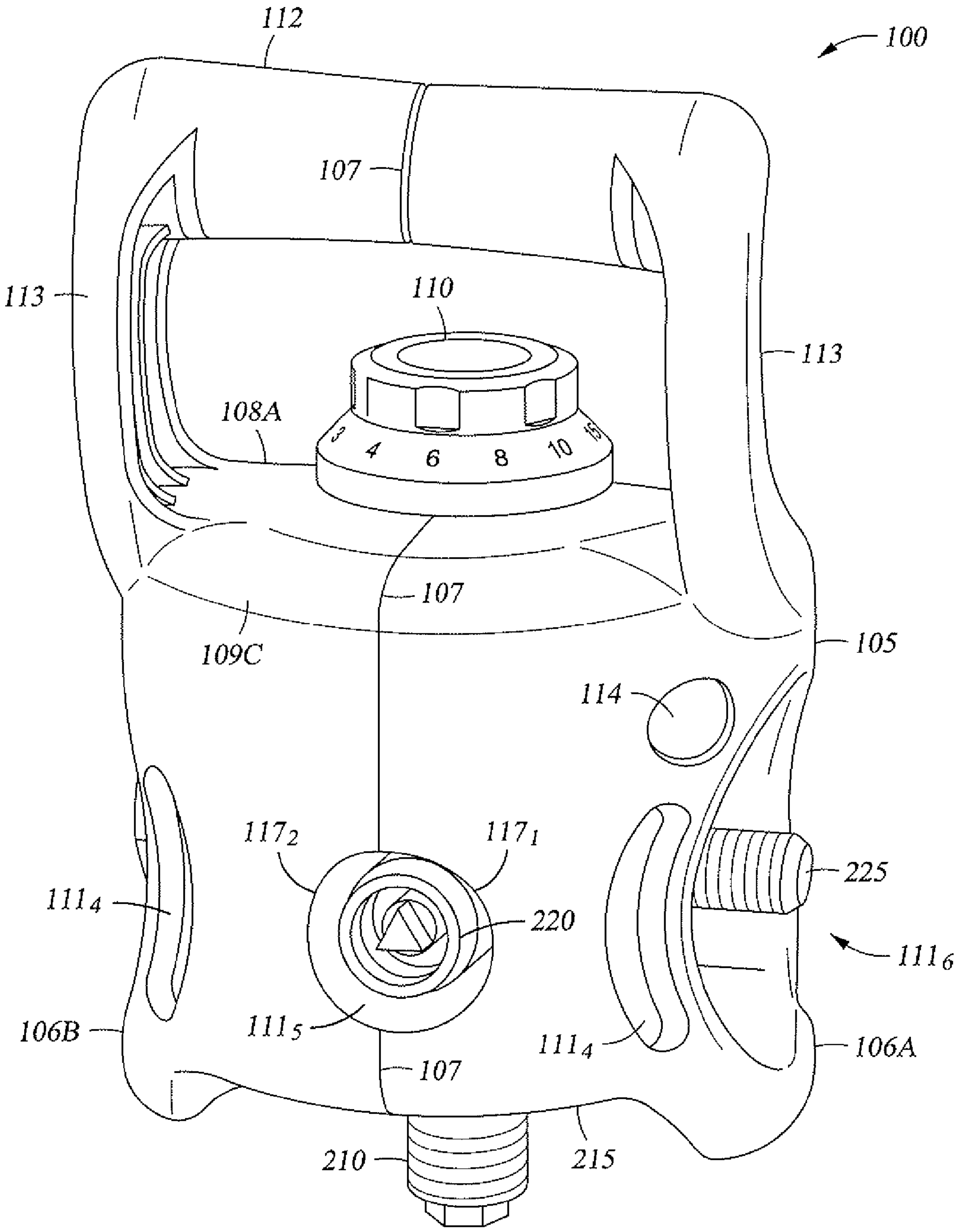
FIG. 2 is an isometric rear view of the gas delivery device housing and body shown in FIG. 1.

FIG. 2 is an isometric rear view of the gas delivery device housing 100 and the body 105 shown in FIG. 1. Surface 108A transitions to a sidewall of the body 105 along a radius 109C to facilitate cleaning of the body 105 as described above. An additional fastening port 114 is shown along with additional openings 111$_N$, such as openings 111$_4$, 111$_5$, and 111$_6$, which are configured to receive portions of the gas delivery device disposed therein. As an example, opening 111$_5$ is adapted to receive a control valve 220 to control filling of gas through a fill port 225 disposed in opening 111$_6$. Opening 111$_5$ may include two portions 117$_1$ and 117$_2$ that are configured as substantial semicircles and form a substantially circular opening when joined at the interface 107.

Figure 5:
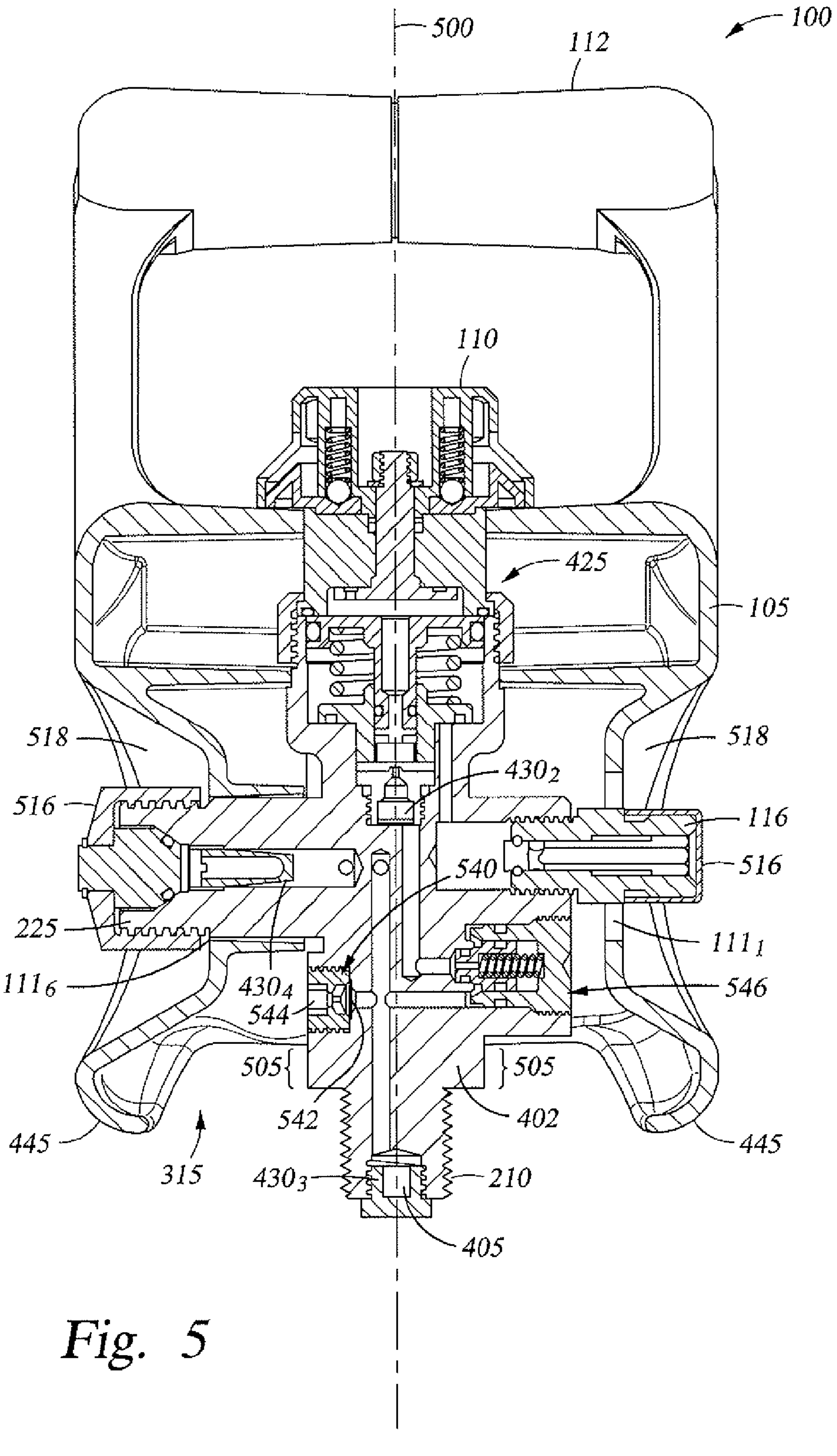
FIG. 5 is a cutaway side view of the gas delivery device housing and the gas control device shown in FIG. 4 that has been rotated 90°.

The gas control device 102 includes a coupling interface 210 configured to couple to a gas cylinder (not shown in this view) by screwing or rotating into a female opening disposed in an upper portion of the cylinder. The coupling interface 210 is adapted to screw into the female opening by rotating one or both of the cylinder and the gas delivery device housing 100 relative to each other, or rotating one of the cylinder and gas delivery device housing 100 while the gas delivery device housing 100 or cylinder is held static, respectively. The coupling interface 210 is adapted to at least partially seal the connection between the gas control device 102 and the cylinder by hand-tightening, but a greater seal may be obtained by rotating the gas control device 102 with a tool or wrench subsequent to hand tightening. To facilitate access to the gas control device 102 by a wrench or tool, the body 105 includes a cutaway portion 215 forming an access area to expose a wrench landing 505 (FIG. 5). Thus, the cutaway portion 215 in the body 105 facilitates access to the gas control device 102 and facilitates tightening (and loosening) of the gas delivery device housing 100 to or from the cylinder without disassembly of the body 105.

Figure 3:
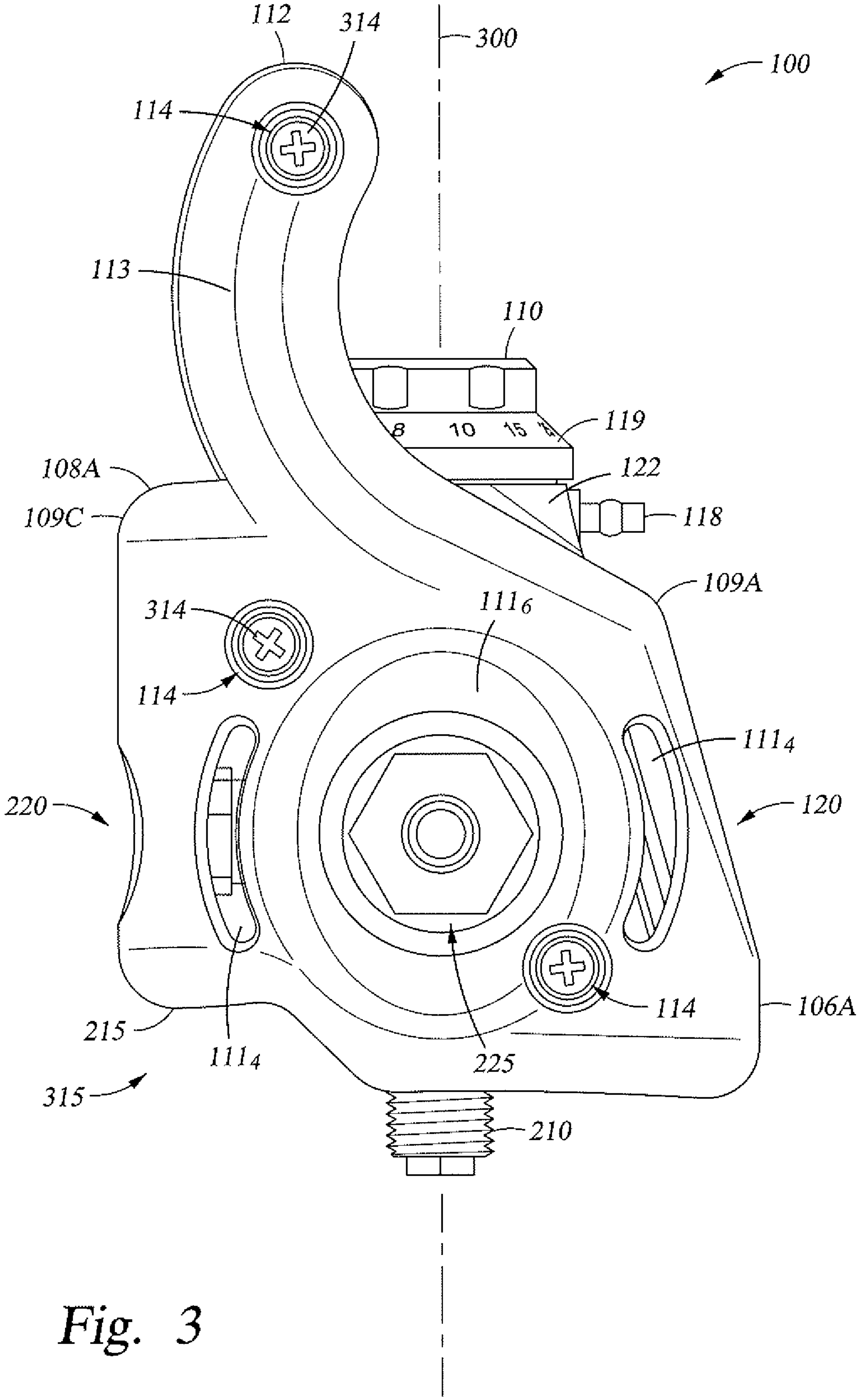
FIG. 3 is a side view of the gas delivery device housing shown in FIGS. 1 and 2.

FIG. 3 is a side view of the gas delivery device housing 100 shown in FIGS. 1 and 2. The first section 106A is shown having three fastener ports 114 each fastener port 114 includes a fastener 314 to couple the first section 106A to the second section 106B (not shown in this view). Each fastener 314 may be a bolt, screw, or other fastening device or object. A first longitudinal axis or plane 300 is also shown through the housing 100. The handle 112 is shown offset from the plane 300 in order to provide maximal access to the handwheel 110 and enhance field of view of the values located on the handwheel 110. The offset handle 112 provides a greater area for rotating the handwheel 110, which may allow a user having a large hand to have easier access for rotating the handwheel 110 during adjustment. Additionally, the offset handle 112 enhances visibility of the values on the handwheel 110 by not obscuring the field of view of the numbers, which may enhance adjustments to the handwheel 110 to increase efficacy and safety. An access area 315 is also shown below the cutaway portion 215 that allows access to the gas control device 102 to facilitate coupling and decoupling of the gas delivery device housing 100 to and from a cylinder (not shown).

Figure 4:
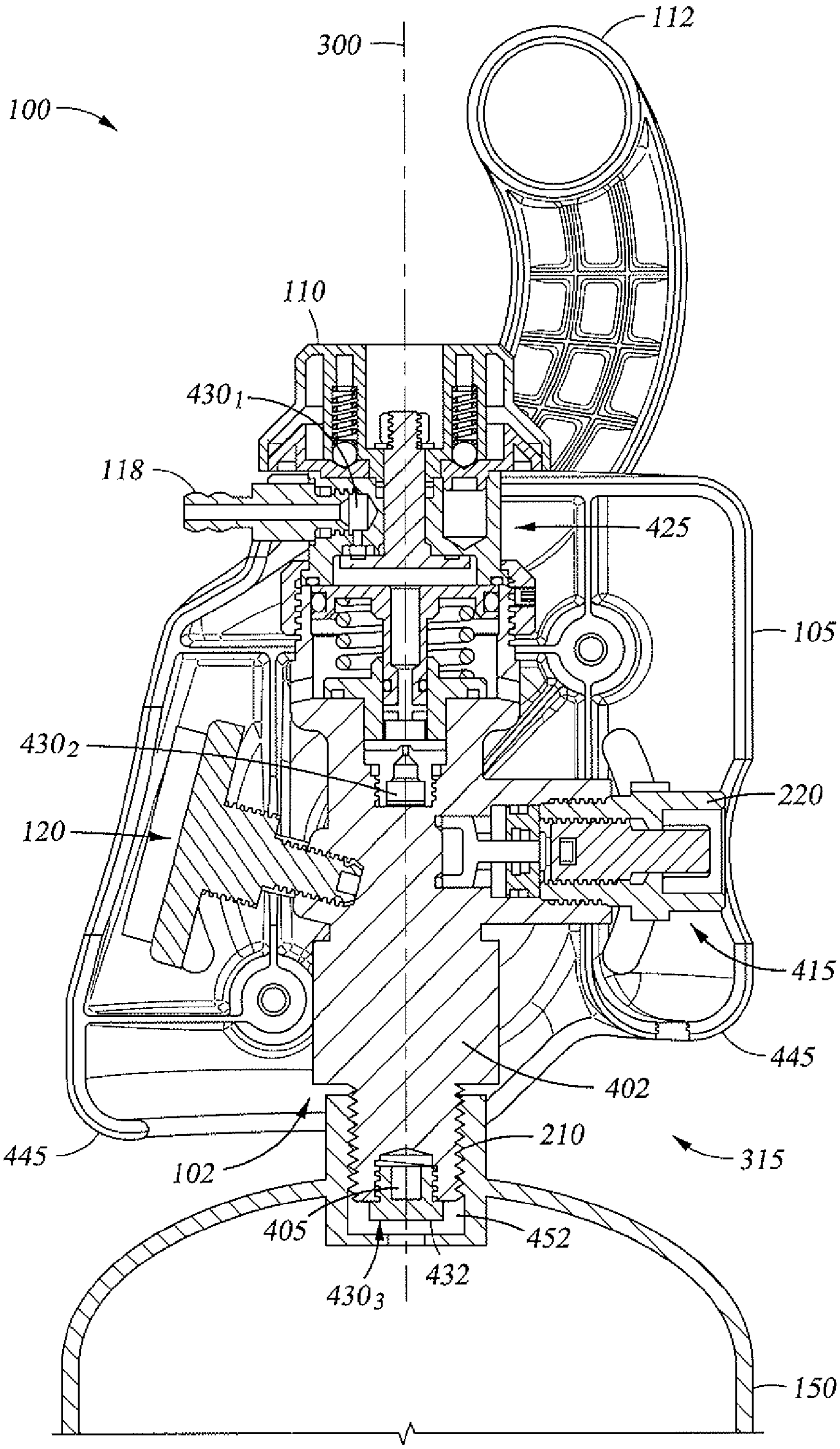
FIG. 4 is a cutaway side view of a gas delivery device housing and the gas control device.

FIG. 4 is a side view of a gas delivery device housing 100 that has been cutaway to show portions of the gas control device 102 disposed therein, which has also been cutaway to show interior portions of the gas control device 102. The gas control device 102 includes a body 402 that may be made of a brass material. The body 402 also includes an inlet port 405 adapted to transfer gas to or from a cylinder 150. The inlet port 405 is in selective fluid communication with a control valve 220, such as a shut-off valve adapted to control release and/or filling of gas through a fill port 225 (FIGS. 2 and 5). The inlet port 405 is also in selective fluid communication with a flow control valve 425 coupled to the handwheel 110 that may control a flow rate of gas to the nipple 118 and/or the connector 116 (not shown in this view). An annular radius 445 is also shown, which may be used as an alternative gripping point or handle for transporting the gas delivery device housing 100 and the cylinder 150 coupled thereto.

The gas control device 102 also includes a plurality of filters adapted to filter incoming or outgoing gas. In one embodiment, the gas control device 102 includes four filters, wherein three of the filters are internal to the body 402 and one of the filters is an external filter that is at least partially external to the body 402. For example, three filters, such as filters 430$_1$, 430$_2$, and 430$_3$ are shown in this view. Filters 430$_1$ and 430$_2$ are internal filters while filter 430$_3$ is external to the body 402 as the filter 430$_3$ extends at least partially out of the body 402. Filter 430$_1$ may filter outgoing gas to the user at the nipple 118, and filter 430$_2$ may filter gas before the gas enters the flow control valve 425 and/or before the gas exits the gas control device 102 when the connector 116 is used. Filter 430$_3$ is positioned in the inlet port 405 and may filter gas as it enters the gas control device 102 from the cylinder 150 or exits the gas control device 102 to the cylinder 150 from the fill port 225 (FIGS. 2 and 5). The filters may be made of a metallic material, such as brass, bronze, a copper (Cu) material, a tin (Sn) material, alloys thereof and combinations thereof. The metallic material may be sintered and includes a porous or microporous structure that is adapted to filter micron sized particles that may be present in the gas as it enters or exits the gas control device 102.

In one embodiment, filter 430$_3$ is configured as an insert having a portion that is received by the intake port 405 of the cylinder 150 and a portion that extends out of the intake port 405 and at least partially covers a lower surface of the coupling interface 210. In this manner, at least a portion of the filter 430$_3$ extends into an opening 452 in the upper portion of cylinder 150. The filter 430$_3$ may include male threads and a hex head 432 configured to be received by female threads formed in the inlet port 405 by rotational movement. The hex head 432 may be tightened to contact and extend out of the lower surface of the coupling interface 210 into the opening 452 of the cylinder 150.

FIG. 5 is a side view of a gas delivery device housing 100 that has been cutaway to show portions of the gas control device 102 disposed therein, which has also been cutaway to show interior portions of the gas control device 102. The gas delivery device housing 100 includes a second longitudinal axis or plane 500 disposed through the housing 100 at an angle orthogonal to the first plane 300 (not shown in this view). The gas delivery device 102 also includes a safety valve 540, which includes a bursting disc 542 and a safety screw 544, that may be used in the event the gas delivery device 102 experiences an overpressure event. A factory set pressure regulator 546 may also be disposed in the body 402, which may control flow rate to the connector 116. The inlet port 405 is in selective fluid communication with the fill port 225 and the connector 116. The inlet port 405 is also in selective fluid communication with the flow control valve 425, which is coupled to the handwheel 110 that may control a flow rate of gas to the nipple 118 (not shown in this view). The inlet port 405 may also be in selective fluid communication with the connector 116. A filter 4304 may be disposed in an inlet portion of the fill port 225 to filter incoming gas to the gas control device 102. The fill port 225 and the connector 116 may also include caps 516 to protect threading formed thereon.

As described above, an access area 315 is formed in the gas delivery device housing 100. The access area 315 is adapted to expose a portion of the gas delivery device 102 to facilitate coupling and decoupling of the gas delivery device housing 100 and the cylinder (not shown in this view). The access area 315 exposes a wrench landing 505 formed on the body 402 of the gas control device 102. The wrench landing 505 may be flatted portions of the body 402 and is adapted to receive a wrench or tool (not shown) to tighten and loosen the gas delivery device housing 100 relative to the cylinder. Thus, the access area 315 provides ingress and egress to the gas control device 102 without disassembly of the gas delivery device housing 100.

The body 105 of the gas delivery device housing 100 may also include concave or dished sidewalls 518 adjacent an opening $\mathbf{111}_N$. As shown in this Figure, openings $\mathbf{111}_1$ and $\mathbf{111}_6$ include a dished sidewall 518 that transitions inward from an outer surface of the body 105. The dished sidewall 518 is adapted to decrease the size of the gas delivery device 102 by admitting the connector 116 and fill port 225 in closer proximity to the body 402 while enhancing access to these connection points. The dished sidewalls 518 may also include a smooth surface that is free of pockets and protrusions in order to enhance cleaning and cleanliness of the body 105.

Figure 6:
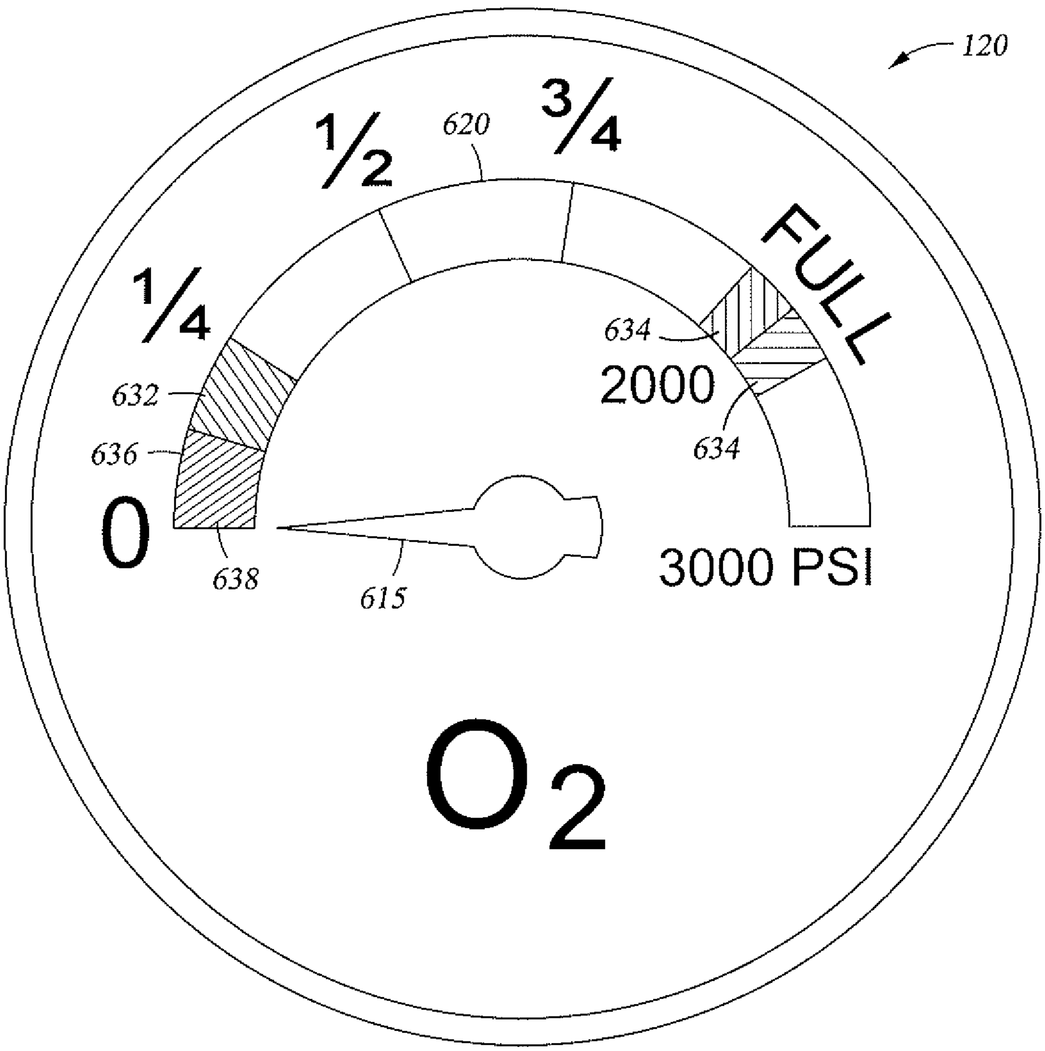
FIG. 6 is a front view of a pressure gauge.

FIG. 6 is a front view of a pressure gauge 120 that may be coupled to the gas control device 102. The pressure gauge 120 includes a face 610 having an arcuate indicator band 620, a pointer 615, and a content indicator, which is depicted as $O_2$ in this example. The pressure gauge 120 is adapted to facilitate a volumetric indication of gas within the cylinder as the gas delivery device is coupled thereto. The pressure gauge 120 is also adapted to facilitate enhanced readability and recognition of the volumetric indication in a "gas gauge" or "fuel gauge" style that may be used in the vehicle industry. For example, the indicator band 620 includes relatively large values indicating a "0" capacity to a "FULL" capacity with incremental values of ¼, ½, and ¾ therebetween. The "fuel gauge" style is used in combination with standard psi values to facilitate recognition of the volumetric indication for users who are sight challenged and/or users who are not familiar with or comfortable reading the psi values. The indicator band 620 may also include regions 632, 634, and 636 that may be shaded or hatched, or include a color scheme to facilitate readability of the pressure gauge 120. For example, regions 632 and 636 may be colored red to indicate a low or near low volume of gas contained in the cylinder, while region 634 may include a green color to indicate a full or near full capacity. The color scheme enhances readability and recognition of capacity without the need to discern specific values and may also serve to alert a user to a near low capacity and prompt a fill or cylinder replacement. Region 636 may also include hatched lines 638 in combination with a color schema.

An improved gas delivery device housing has been described. The gas delivery device housing 100 houses and protects a gas control device that facilitates delivery of gas to a user or device, and may also be adapted to provide a cylinder filling capability. The housing 100 includes a surface free from unnecessary depressions and/or protrusions to facilitate cleanability and enhance safety. Adjustment indicators and status indication elements disposed in or on portions of the housing 100 are configured to enhance readability and recognition, which facilitates safe and efficient operation. Adjustable elements to control a flow metric from the gas control device are adapted to facilitate adjustment by a user with a large hand or a user suffering from some diminished physical capability.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A portable gas delivery apparatus, comprising:

a gas control device configured to couple to a compressed gas cylinder and comprising an integrated regulator, a fill valve and a dial configured to rotate about a central axis to thereby control gas flow from the compressed gas cylinder through the regulator; and a multi-piece body comprising:

a first body portion and a second body portion forming substantially symmetrical halves of a housing configured to encase at least a portion of the gas control device, wherein the first and the second body portions engage one another at an interface to form the housing, the interface being disposed on a longitudinal plane; wherein the first and the second body portions form a first opening at the interface through which the dial is disposed, and the first and the second body portions form a second opening at the interface through which a pressure gauge is disposed; and a handle sized to accommodate a human hand, the entire structural length forming the handle is configured to a) be disposed on an axis oriented orthogonally to the longitudinal plane of the interface where the first and the second body portions engage one another and b) be offset from the central axis of the dial; wherein the handle is supported from the multi-piece body by at least one curved extension of the first body portion wherein the handle is further supported by a second curved extension from the second portion separated from the at least one curved extension of the first body portion by the handle and the dial.

2. The apparatus of claim 1, further comprising:

at least two curved slots formed in each of the first half and second half.

3. The apparatus of claim 1, further comprising:

an annular radius disposed in a lower portion of the body.

4. The apparatus of claim 1, wherein each of the first portion and the second body portion include a recess to expose a part of the gas control device.

5. The apparatus of claim 1, wherein the housing includes an access area formed by a recess in the first body portion and the second body portion.

6. The apparatus of claim 1, wherein the pressure gauge has values indicating a "0" capacity to a "FULL" capacity with incremental values of ¼, ½, and ¾ there between.

7. The apparatus of claim 1, wherein the gas control device includes at least four filters.

8. The apparatus of claim 7, wherein one of the at least four filters extends at least partially out of the gas control device.

9. The apparatus claim 8, wherein one of the at least four filters extends at least partially out of a coupling interface of the gas control device.

10. The apparatus of claim 1, further comprising;

a gas outlet nipple coupled to the gas control device and extending from the body, wherein the dial includes a plurality of selectable settings capable of being selected by rotating the dial, the selected setting of the plurality of settings being registered with the nipple.

11. The apparatus of claim 1, further comprising a recess formed in a lower edge of the first portion and the second portion defining a cutaway portion exposing a wrench landing formed on the gas control device.

* * * * *